United States Patent [19]

Miwa et al.

[11] Patent Number: 5,418,712
[45] Date of Patent: May 23, 1995

[54] MANIPULATION PERFORMANCE EVALUATING APPARATUS FOR EVALUATING MANIPULATION PERFORMANCE OF A COMMODITY HAVING OPERATING PARTS

[75] Inventors: Michio Miwa, Tokyo; Toru Kawaguchi, Fujisawa; Takamasa Oyama, Kawasaki; Masao Kato; Hironobu Suzuki, both of Yokohama, all of Japan

[73] Assignee: Matsushita Electric Industrial Co., Ltd., Osaka, Japan

[21] Appl. No.: 251,997

[22] Filed: Jun. 1, 1994

[30] Foreign Application Priority Data

Jun. 4, 1993 [JP] Japan .................................. 5-158048
Apr. 6, 1994 [JP] Japan .................................. 6-068371

[51] Int. Cl.$^6$ .................. G06F 3/033; G06F 17/50
[52] U.S. Cl. ........................... 364/188; 345/158; 395/119; 395/155; 364/190
[58] Field of Search .................. 364/188, 189, 190; 395/119, 120, 124, 155, 157; 318/628; 345/157, 158, 169

[56] References Cited

U.S. PATENT DOCUMENTS

| | | | |
|---|---|---|---|
| 4,988,981 | 1/1991 | Zimmerman et al. | 345/158 |
| 5,261,041 | 11/1993 | Susman | 395/119 |
| 5,305,429 | 4/1994 | Sato et al. | 395/155 |

*Primary Examiner*—Roy N. Envall, Jr.
*Assistant Examiner*—Steven R. Garland
*Attorney, Agent, or Firm*—Lowe, Price, LeBlanc & Becker

[57] ABSTRACT

There is disclosed an evaluating apparatus for evaluating a manipulation performance of a commodity with operating parts. Three dimensional position and orientation of a first body like an operator's fingertip is detected to virtually display the first body. Also, configuration and functions of operating parts planned to be attached to a commodity are set, and three dimensional position and orientation of a second body like a commodity model having the same external shape as that of the commodity is detected to virtually display the commodity with the operating parts. When a planned area of the second body is manipulated by the first body, a contact of the second body with the first body is detected, and an operating part Po placed at a position corresponding to the planned area is detected. Thereafter, the operating part Po of which an external shape is virtually changed by the manipulation of the first body is displayed according to the configuration and function of the operating part Po. Accordingly, an operator can actually feel a state that the external shape of the commodity is changed when the operator virtually manipulates the commodity, without making the commodity on an experimental basis.

9 Claims, 12 Drawing Sheets

FIG. 12A
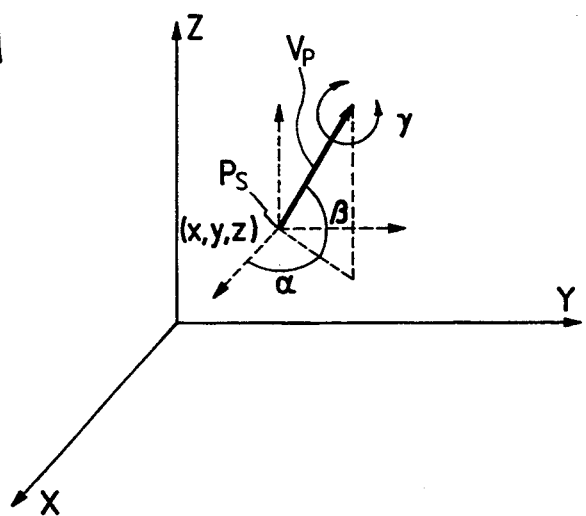
FIG. 12B
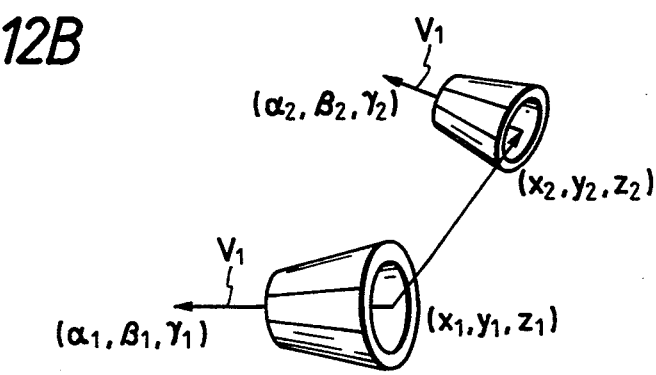
FIG. 13
| MANIPULATION | COORDINATE AND DIRECTIONAL ANGLE DATA | |
|---|---|---|
| | FIRST BODY | SECOND BODY |
| FIRST MANIPULATION | $(x_1, y_1, z_1, \alpha_1, \beta_1, \gamma_1)$ | $(x_{11}, y_{11}, z_{11}, \alpha_{11}, \beta_{11}, \gamma_{11})$ |
| SECOND MANIPULATION | $(x_2, y_2, z_2, \alpha_2, \beta_2, \gamma_2)$ | $(x_{12}, y_{12}, z_{12}, \alpha_{12}, \beta_{12}, \gamma_{12})$ |
| ⋮ | ⋮ | ⋮ |

MANIPULATION PERFORMANCE EVALUATING APPARATUS FOR EVALUATING MANIPULATION PERFORMANCE OF A COMMODITY HAVING OPERATING PARTS

BACKGROUND OF THE INVENTION

1. Field of the Invention

The present invention relates generally to an evaluating apparatus in which a shape of a commodity is virtually displayed in an image plane to evaluate the shape and functions of the commodity at a design stage of the commodity or a trial manufacture state of the commodity, and more particularly to a manipulation performance evaluating apparatus in which a manipulation performance of a commodity is evaluated by virtually displaying the commodity in a state that an operating part of the commodity is operated.

2. Description of the Prior Art

A computer aided design (CAD) system with which a shape of a commodity is displayed in an image plane and is changed to a better shape while the shape of the commodity is evaluated by an operator at a design stage of the shape of the commodity has been widely used in recent years. In particularly, a three dimensional graphic display technique has been recently used to display an external appearance of the commodity in three dimensions. Therefore, the shape of the commodity can be thoroughly examined and designed at a design stage of the commodity prior to a trial manufacture state of the commodity by observing the external appearance of the commodity displayed in the image plane.

2.1. PREVIOUSLY PROPOSED ART

A conventional CAD system is described with reference to FIGS. 1, 2.

FIG. 1 is a block diagram of a conventional CAD system. FIG. 2 is a diagonal view of the conventional CAD system in which a commodity is displayed in a displaying means shown in FIG. 1.

As shown in FIG. 1, a conventional CAD system 11 is provided with an input means 12 such as a keyboard or a mouse for inputting a piece of orientation data and a piece of position data specifying the orientation and position of a commodity, a shape data storing means 13 for storing pieces of shape data of the commodity designating an external shape of the commodity, a shape and position describing means 14 for producing pieces of changed shape data by changing the shape data stored in the shape data storing means 13 according to the orientation data and the position data of the commodity input to the input means 12, and a displaying means 15 such as an image plane for displaying the external shape of the commodity positioned and oriented at particular position and orientation specified by the orientation data and the position data of the commodity according to the changed shape data.

In the above configuration, as shown in FIG. 2, external shape and parts of a commodity are initially read from the shape data storing means 13 to the shape and position describing means 14, and an external shape of the commodity is displayed in the displaying means 15 to examine an external shape and function of the commodity. Thereafter, a piece of orientation data and a piece of position data are input to the input means 12 to change the orientation and position of parts of the commodity to a particular position and a particular orientation. Therefore, another external shape of the commodity changed to the particular position and orientation is displayed in the displaying means according to the changed orientation and position data.

Therefore, when an operator inputs the orientation and position data to the input means 12 to instruct the commodity to change the orientation and position of the commodity parts by the translation movement and rotation, the orientation and rotation of the commodity parts displayed in the displaying means 15 are changed. Accordingly, the external shape of the commodity can be examined from an arbitrary observational direction, and the shape of an arbitrary portion of commodity can be reshaped.

2.2. PROBLEMS TO BE SOLVED BY THE INVENTION

However, the external shape of the commodity is merely examined at the design stage in the conventional CAD system 11. In other words, the commodity cannot be displayed at a state that an operating part of the commodity is operated or at another state that an operating part of the commodity is functioning. Therefore, in cases where the evaluation of an manipulation performance of the commodity is required, it is necessary to make the commodity on an experimental basis. In cases where there is an inconvenient or incommodious manipulation performance in the commodity made on an experimental basis, not only the design of the commodity but also the trial manufacture of the commodity are required to be tried again. Therefore, there is a drawback that it takes a lot of time to evaluate the manipulation performance of the commodity because the trial manufacture of the commodity is required many times. Also, there is another drawback that a manufacturing cost of the commodity is considerably increased to evaluate the manipulation performance of the commodity.

Also, there is another drawback that an operator cannot actually feel a state that an external shape of a commodity is changed when the operator operates the commodity.

Also, there is another drawback that an operator cannot actually feel the movement or operation of an associated equipment which is moved or operated by the operation of the commodity.

Also, the operator is required to input a piece of orientation data and a piece of position data specifying the orientation and position of a commodity to the input means 12 each time the operator intends to perform a manipulation for examining the external shape of the commodity from an observational direction. Therefore, even though the operator intends to perform the same manipulation as that previously performed, the operator is required to input again the orientation data and the position data. Accordingly, it is troublesome to input the orientation data and the position data each time a manipulation is performed.

Also, in cases where a size of the commodity is changed, the operator is required to change the shape data of the commodity stored in the shape data storing means 13. Therefore, there is another drawback that the change of the shape data is troublesome.

SUMMARY OF THE INVENTION

A first object of the present invention is to provide, with due consideration to the drawbacks of such a conventional CAD system, a manipulation performance evaluating apparatus in which a manipulation performance of a commodity having the same external shape as that of a commodity model is evaluated without making the commodity on an experimental basis.

A second object is to provide a manipulation performance evaluating apparatus in which an operator actually feels a state that the external shape of the commodity is changed when the operator virtually manipulates the commodity, without making the commodity on an experimental basis.

A third object is to provide a manipulation performance evaluating apparatus in which an operator actually feels the movement or operation of an associated equipment which is caused by a virtual operation of the commodity, without making the commodity on an experimental basis.

A fourth object is to provide a manipulation performance evaluating apparatus in which any piece of input data is not required to perform the same manipulation as that previously performed.

A fifth object is to provide a manipulation performance evaluating apparatus in which an operator actually feels a sense of touch when the operator virtually manipulates the commodity.

A sixth object is to provide a manipulation performance evaluating apparatus in which a manipulation performance of a commodity is easily evaluated even though a size of the commodity is changed.

The first and second objects are achieved by the provision of a manipulation performance evaluating apparatus for evaluating a manipulation performance of an evaluated commodity with an operating part by interfering a first body with a second body imitating the evaluated commodity to virtually manipulate the operating part with the first body, comprising:

first position and orientation inputting means for inputting three dimensional position and orientation of a first body;

second position and orientation inputting means for inputting three dimensional position and orientation of a second body, an external shape of the second body being similar to that of an evaluated commodity;

function setting means for setting a particular position of an operating part attached to the evaluated commodity and a movement of the operating part virtually manipulated by the first body;

interference detecting means for detecting an interference of the second body placed at the three dimensional position and orientation input to the second position and orientation inputting means with the first body placed at the three dimensional position and orientation input to the first position and orientation inputting means and detecting the operating part virtually placed at the particular position of the evaluated commodity set in the function setting means, the particular position corresponding to an interfering point at which the second body interferes with the first body;

expected movement editing means for editing an expected movement of the operating part of the evaluated commodity detected in the interference detecting means according to the movement of the operating part set in the function setting means, an external shape of the operating part being virtually changed by the manipulation of the first body;

first position and shape describing means for producing an external shape of the first body placed at the three dimensional position and orientation input to the first position and orientation inputting means to describe the first body with which the operating part attached to the evaluated commodity is virtually manipulated;

second position and shape describing means for producing an external shape of the second body placed at the three dimensional position and orientation input to the second position and orientation inputting means to describe an external shape of the evaluated commodity placed at the three dimensional position and orientation input to the second position and orientation inputting means and an external shape of the operating part virtually changed according to the expected movement edited in the expected movement editing means; and virtual image displaying means for virtually displaying the external shape of the evaluated commodity with the operating part described in the second position and shape describing means and the first body described in the first position and shape describing means to evaluate a manipulation performance of the evaluated commodity with the operating part.

In the above configuration, three dimensional position and orientation of a first body are input to the first position and orientation inputting means, and three dimensional position and orientation of a second body are input to the first position and orientation inputting means. The second body imitates an external shape of an evaluated commodity to virtually display the evaluated commodity. Therefore, an external shape of the second body is similar to that of the evaluated commodity. Also, a particular position of an operating part planned to be attached to the evaluated commodity and a movement of the operating part are set in advance in the function setting means. Thereafter, an interference of the second body with the first body at an interfering point is detected in the interfere detecting means. The interfering point corresponds to the particular position of the operating part planned to be attached to the evaluated commodity. Therefore, the operating part is also detected in the interfere detecting means. Thereafter, an expected movement of the operating part of the evaluated commodity is edited in the expected movement editing means according to the movement of the operating part set in the function setting means. In this case, the operating part is virtually moved by the manipulation of the first body. Thereafter, an external shape of the evaluated commodity placed at the three dimensional position and orientation input to the second position and orientation inputting means is described in the first position and shape describing means, and an external shape of the evaluated commodity placed at the three dimensional position and orientation input to the second position and orientation inputting means is described in the second position and shape describing means. Also, the operating part virtually moved is described in the second position and shape describing means. Thereafter, the external shape of the evaluated commodity with the operating part and the first body are virtually displayed in the virtual image displaying means.

Accordingly, a manipulation performance of the evaluated commodity can be evaluated without making the evaluated commodity on an experimental basis because the second body of which the external shape is similar to that of the evaluated commodity interferes with the first body to display the evaluated commodity virtually manipulated by the first body.

Also, an operator can actually feel a state that the external shape of the evaluated commodity is changed when the operator virtually manipulates the evaluated commodity, without making the evaluated commodity on an experimental basis because the expected movement of the operating part is edited in the expected movement editing means to display the external shape of the operating part virtually changed in the virtual image displaying means.

To achieve the third object in addition to the first and second objects, it is preferred that the evaluating apparatus additionally include control signal generating means for generating a control signal according to a function of the operating part caused by the expected movement of the operating part of the evaluated commodity manipulated in the expected movement editing means, an associated equipment being moved or operated according to the control signal transferred from the control signal generating means.

In the above configuration, a control signal is generated in the control signal generating means to move or operate an associated equipment according to a function of the operating part which is virtually manipulated by the first body.

Accordingly, an operator actually feels the movement or operation of the associated equipment which is caused by a virtual operation of the evaluated commodity, without making the evaluated commodity on an experimental basis.

To achieve the third object in addition to the first and second objects, it is also preferred that the evaluating apparatus additionally include communication information generating means having a telecommunication facility for generating a control signal according to a function of the operating part caused by the expected movement of the operating part of the evaluated commodity edited in the expected movement editing means to telecommunicate the control signal to an associated equipment with the telecommunication facility, the associated equipment being moved or operated according to the control signal telecommunicated.

In the above configuration, a control signal is generated in the communication information generating means to move or operate an associated equipment according to a function of the operating part which is virtually manipulated by the first body. In this case, because a telecommunication facility is provided for the communication information generating means, the control signal is telecommunicated to the associated equipment with the telecommunication facility.

Accordingly, an operator actually feels the movement or operation of the associated equipment which is caused by a virtual operation of the evaluated commodity, without making the evaluated commodity on an experimental basis.

To achieve the fourth object in addition to the first and second objects, it is preferred that the evaluating apparatus additionally include state change storing means for storing the position of the first body produced in the first position and shape describing means and the position and external shape of the second body produced in the second position and shape describing means each time an interference of the second body with the first body is detected in the interference detecting means, the position of the first body and the position and external shape of the second body pertaining to a manipulation being read out from the state change storing means to the first position and shape describing means and the second position and shape describing means to virtually display the first body and the evaluated commodity with the operating part after the manipulation is finished.

In the above configuration, the position of the first body and the position and external shape of the second body produced in the first position and shape describing means and the second position and shape describing means are stored in the state change storing means each time an interference of the second body with the first body is detected in the interference detecting means. Therefore, even though a second manipulation following a first manipulation is performed, in cases where the position of the first body and the position and external shape of the second body pertaining to the first manipulation are read out from the state change storing means to the first position and shape describing means and the second position and shape describing means after the second manipulation is finished, the first manipulation can be performed again without inputting any three dimensional position and orientation to the first position and orientation inputting means or the second position and orientation inputting means.

Also, to achieve the fourth object in addition to the first and second objects, it is preferred that the evaluating apparatus additionally include state change storing means for storing the position of the first body produced in the first position and shape describing means and the position and external shape of the second body produced in the second position and shape describing means at regular intervals, the position of the first body and the position and external shape of the second body being read out from the state change storing means to the first position and shape describing means and the second position and shape describing means at the regular intervals to virtually display the first body and the evaluated commodity with the operating part.

In the above configuration, the position of the first body and the position and external shape of the second body produced in the first position and shape describing means and the second position and shape describing means are stored in the state change storing means at regular intervals. Therefore, even though a second manipulation following a first manipulation is performed, in cases where the position of the first body and the position and external shape of the second body pertaining to the first manipulation are read out from the state change storing means to the first position and shape describing means and the second position and shape describing means after the second manipulation is finished, the first manipulation can be performed again without inputting any three dimensional position and orientation to the first position and orientation inputting means or the second position and orientation inputting means.

To achieve the fifth object in addition to the first and second objects, it is preferred that the evaluating apparatus additionally include touch sense generating means for generating a sense of touch with the operating part according to the detection of the interference of the second body with the first body detected in the interference detecting means, an operator actually feeling the sense of touch.

In the above configuration, when the interference of the second body with the first body is detected in the interference detecting means, a sense of touch with the operating part is generated in the touch sense generating means. Therefore, an operator can actually feel the sense of touch when the evaluated commodity is virtually manipulated with the first body. Accordingly, a manipulation performance of the evaluated commodity can be evaluated according to the operator's actual feeling.

To achieve the sixth object in addition to the first and second objects, it is preferred that the evaluating apparatus additionally include external shape scaling means for simulatively scaling up or down the external shape of the first or second body produced in the first position and shape describing means or the second position and shape describing means.

In the above configuration, in cases where the external shape of the first body produced in the first position and shape describing means is sealed up or down in the external shape scaling means, even though a size of the first body actually operating the evaluated commodity is larger or smaller than that of the first body virtually manipulating the evaluated commodity, a manipulation performance of the evaluated commodity can be evaluated. Also, in cases where the external shape of the second body produced in the second position and shape describing means is scaled up or down in the external shape scaling means, even though the external shape of the second body is larger or smaller than that of the evaluated commodity, a manipulation performance of the evaluated commodity can be evaluated.

To achieve the sixth object in addition to the first and second objects, it is also preferred that the evaluating apparatus additionally include first external shape scaling means for simulatively scaling up or down the external shape of the first body produced in the first position and shape describing means, and second external shape scaling means for simulatively scaling up or down the external shape of the second body produced in the second position and shape describing means.

In the above configuration, the external shapes of the first and second bodies produced in the first position and shape describing means and the second position and shape describing means are scaled up or downed in the first external shape scaling means and the second external shape scaling means. Therefore, a height of the interfering point at which the second body interferes with the first body can be arbitrarily set without being limited by a size of the second body.

BRIEF DESCRIPTION OF THE DRAWING

The objects, features and advantages of the present invention will be apparent from the following description taken in conjunction with the accompanying drawings, in which:

FIG. 12A shows a positional vector designating three dimensional position and orientation of a body;

FIG. 12B shows a positional vector defined to designate the three dimensional position and orientation of a first body;

FIG. 13 shows pieces of processed coordinate data denoting three dimensional position and orientation of a first body and pieces of processed figure data denoting three dimensional position and orientation of a second body in tabular form;

DESCRIPTION OF THE PREFERRED EMBODIMENTS

Preferred embodiments of a manipulation performance evaluating apparatus according to the present invention are described with reference to the drawings.

(First Embodiment)

Figure 1:
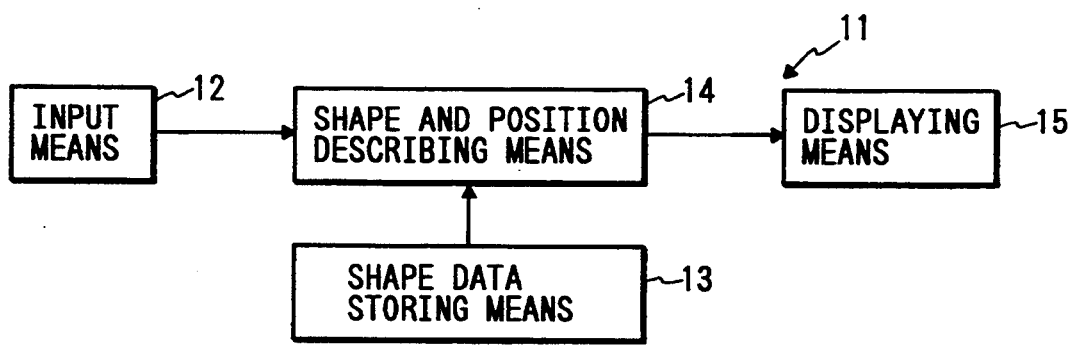
FIG. 1 is a block diagram of a conventional CAD system.
Figure 2:
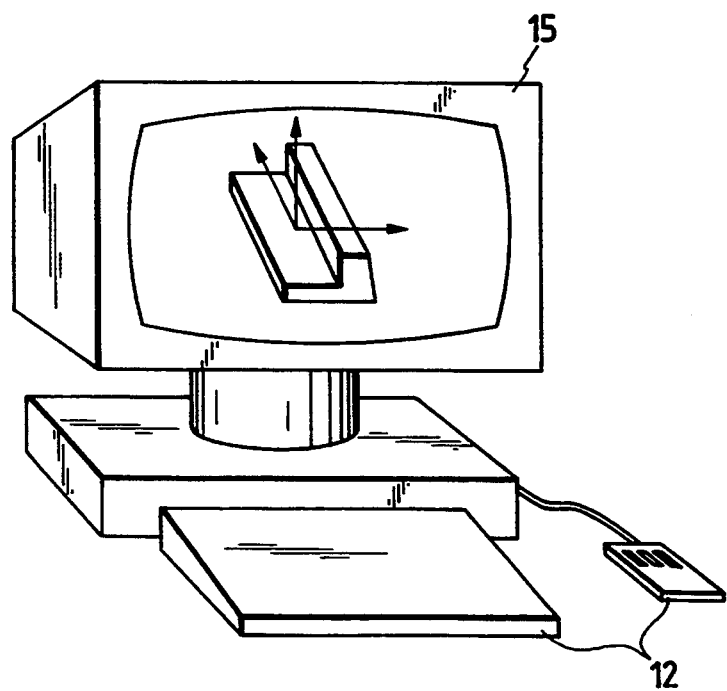
FIG. 2 is a diagonal view of the conventional CAD system in which a commodity is displayed in a displaying means shown in FIG. 1.
Figure 3:
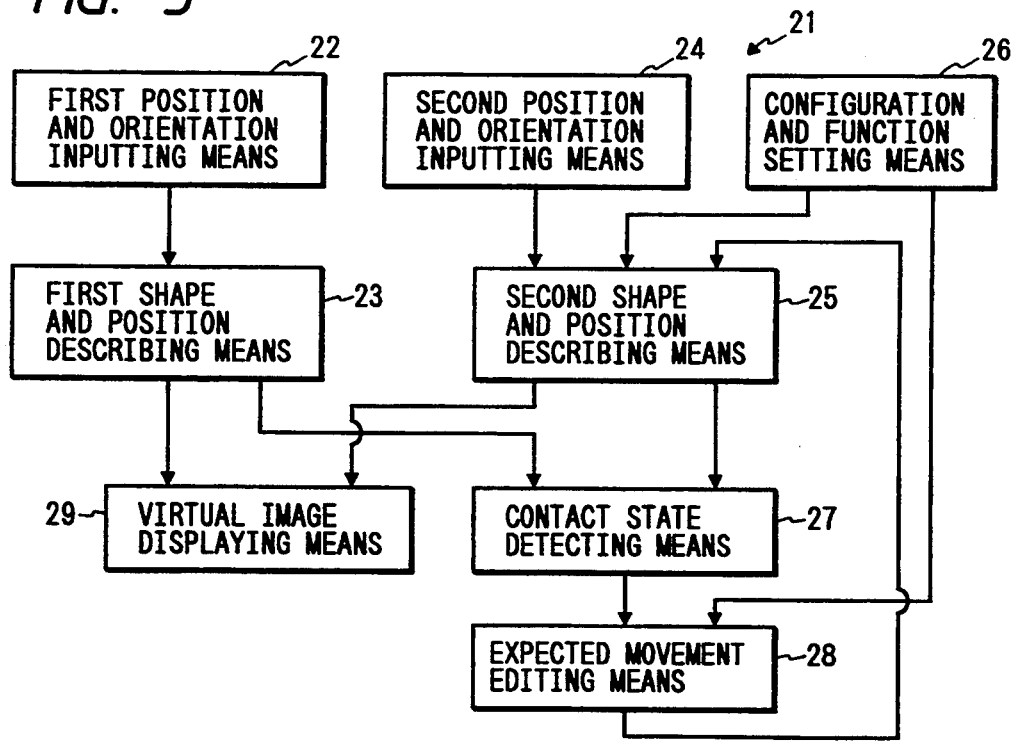
FIG. 3 is a block diagram of a manipulation performance evaluating apparatus according to a first embodiment of the present invention.
Figure 4A:
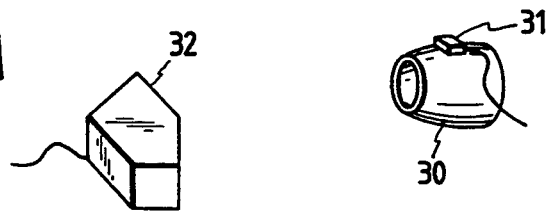
FIG. 4A is a diagonal view of a first position and orientation inputting means shown in FIG. 3.
Figure 4B:
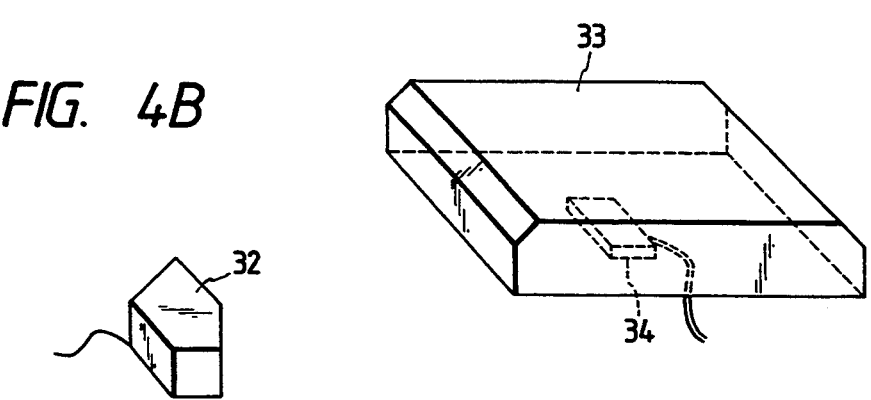
FIG. 4B is a diagonal view of a second position and orientation inputting means shown in FIG. 3.

FIG. 3 is a block diagram of a manipulation performance evaluating apparatus according to a first embodiment of the present invention. FIG. 4A is a diagonal view of a first position and orientation inputting means shown in FIG. 3. FIG. 4B is a diagonal view of a second position and orientation inputting means shown in FIG. 3.

As shown in FIG. 3, a manipulation performance evaluating apparatus 21 for evaluating a manipulation performance of an evaluated commodity comprises a first position and orientation inputting means 22 for detecting three dimensional position and orientation of a first body such as an operator's fingertip to input the three dimensional position and orientation of the first body, a first shape and position describing means 23 for describing an external shape of the first body which is placed at the three dimensional position and orientation of the first body detected in the first position and orientation inputting means 22 and virtually manipulates the evaluated commodity, a second position and orientation inputting means 24 for detecting three dimensional position and orientation of a second body such as a commodity model, a second shape and position describing means 25 for producing an external shape of the second body placed at the three dimensional position and orientation of the second body detected in the second position and orientation inputting means 24 to describe an external shape of the evaluated commodity virtually placed at the same three dimensional position and orientation as those of the second body, a configuration and function setting means 26 for setting positions of operating parts attached to the evaluated commodity and movements of the operating parts virtually manipulated by the operator, a contact state detecting means 27 (or an interference detecting means 27) for examining whether or not the first body is in contact with the second body at an interfering point to detect an interference of the second body with the first body and detecting an operating part Po of the evaluated commodity to be placed at the interfering point, an expected movement editing means 28 for editing an expected movement of the operating part Po of the evaluated commodity detected in the contact state detecting means 27 according to the movement of the operating part Po set in the configuration and-function setting means 26, and a virtual image displaying means 29 for virtually displaying the first body and an external shape of the evaluated commodity in which the operating part Po virtually manipulated by the first body is deformed according to the expected movement of the operating part Po.

As shown in FIG. 4A, the first position and orientation inputting means 22 is composed of an attaching element 30 put on an operator's finger and a first magnetic sensor 31 fixed to the attaching element 30. Three types of magnetic fields Mx, My, Mz directed in an X direction, a Y direction and a Z direction are generated one after another in a magnetic field generating apparatus 32 placed at a reference position. Therefore, in cases where intensities of the magnetic fields Mx, My, Mz are detected in order in the first magnetic sensor 31, the three dimensional position and orientation of the first body are detected in the first position and orientation inputting means 22.

As shown in FIG. 4B, the second body is a commodity model 33 of which an external shape is determined by imitating an external shape of an evaluated commodity, and the second position and orientation inputting means 24 is a second magnetic sensor 34 buried in the commodity model 33. Therefore, in cases where the intensities of the magnetic fields Mx, My, Mz generated in the magnetic field generating apparatus 32 are detected in order in the second magnetic sensor 34, the three dimensional position and orientation of the commodity model 33 are detected in the second position and orientation inputting means 24.

Figure 5:
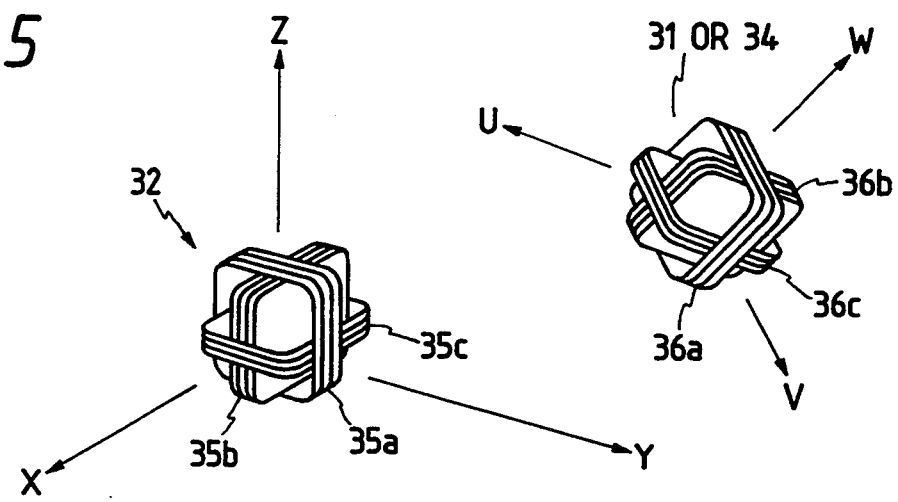
FIG. 5 explanatorily shows a magnetic interaction between a magnetic field generating apparatus and a first or second magnetic sensor shown in FIGS. 4A, 4B.

FIG. 5 explanatorily shows a magnetic interaction between the magnetic field generating apparatus 32 and the first or second magnetic sensor 31 or 34.

As shown in FIG. 5, the magnetic field generating apparatus 32 is provided with three oscillation coils 35a, 35b, 35c orthogonal to each other, and each of the first and second magnetic sensors 31, 34 is provided with three receiving coils 36a, 36b, 36c orthogonal to each other. When three magnetic fields orthogonal to each other are generated one after another by supplying electric currents to the oscillation coils 35a, 35b, 35c in order, electric currents are induced one after another in the receiving coils 36a, 36b, 36c of the first or second magnetic sensor 31 or 34. Therefore, the three dimensional position and orientation of the first body are determined by measuring intensities of the electric currents induced in the receiving coils 36a, 36b, 36c of the first magnetic sensor 31, and the three dimensional position and orientation of the the second body (or the commodity model 33) are determined by measuring intensities of the electric currents induced in the receiving coils 36a, 36b, 36c of the second magnetic sensor 34.

Each of the first and second bodies is generally modeled after a rectangular prism, and pieces of initial coordinate data denoting vertex positions of six sides of the first body originally placed are stored in the first shape and position describing means 23. Also, pieces of initial coordinate data denoting vertex positions of six sides of the second body originally placed are stored in the second shape and position describing means 25.

In the configuration and function setting means 26, pieces of configuration data corresponding to the configuration of the operating parts and pieces of function data corresponding to functions of the operating parts are set by the operator in advance and are stored. For example, the number of operating parts such as an operating button, a slider and the like, a position of an operating side at which the operating parts are planned to be attached to the evaluated commodity, shapes of the operating parts, and positions of the operating parts at the operating side of the evaluated commodity are stored as the configuration data. Also, changed shapes of the operating parts in operation periods when the operating parts are manipulated by the first body and functions of the operating parts utilized to move or operate an associated equipment are stored as the function data.

Figure 6A:
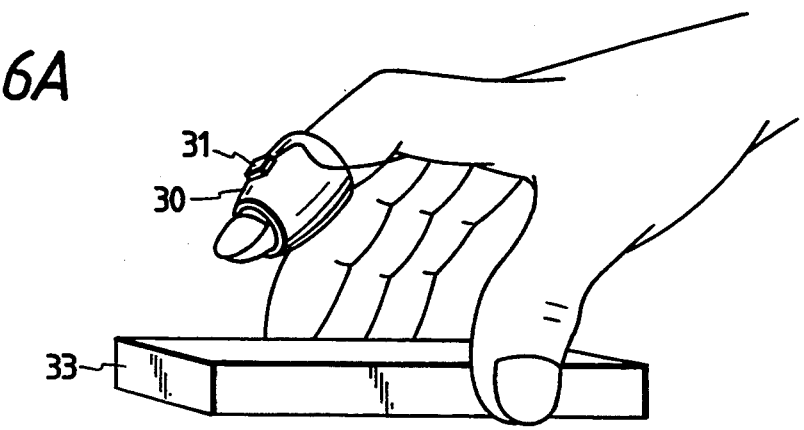
FIG. 6A explanatorily shows an operation in which a commodity model is grasped by an operator's hand without pushing the commodity model with an operator's finger on which an attaching element with a first magnetic sensor is put.

In the above configuration of the manipulation performance evaluating apparatus 21, in cases where an operator imitatively manipulates an evaluated commodity, the commodity model 33 having the same external shape as that of the evaluated commodity is prepared. Thereafter, the attaching element 30 with the first magnetic sensor 31 is put on a finger of the operator, and the operator grasps the commodity model 33 with the second magnetic sensor 84 by his hand, as shown in FIG. 6A. Thereafter, the position and orientation of the first body equivalent to the operator's fingertip are measured by the first magnetic sensor 31 denoting the first position and orientation inputting means 22, and the position and orientation of the second body equivalent to the commodity model 33 are measured by the second magnetic sensor 34 denoting the second position and orientation inputting means 24. Thereafter, pieces of first measured data obtained in the first magnetic sensor 31 are transferred to the first shape describing means 23, and pieces of second measured data obtained in the second magnetic sensor 34 are transferred to the second shape and position describing means 25.

In the first shape and position describing means 23, the initial coordinate data designating an external shape of the first body originally placed at reference position and orientation are changed to pieces of processed coordinate data by performing the translation movement and rotation of the first body according to the first measured data denoting the position and orientation of the first body. the processed coordinate data designates an external shape of the first body placed at the three dimensional position and orientation of the first body detected in the first position and orientation inputting means 22. Thereafter, the processed coordinate data are transferred to the virtual image displaying means 29.

Figure 6B:
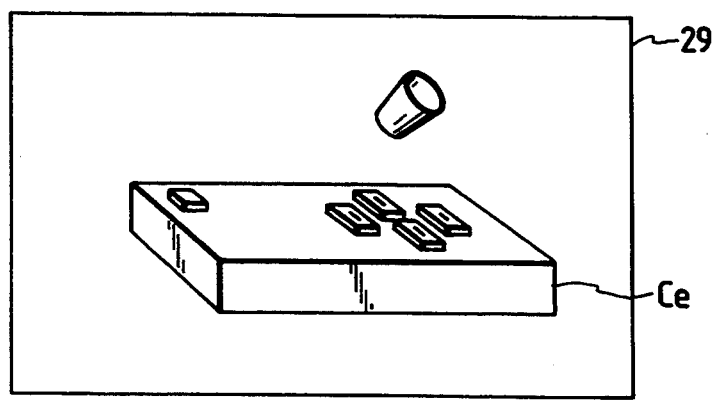
FIG. 6B shows a commodity model with a plurality of operating parts and an operator's fingertip representing a first body which are displayed in an image plane according to the operation shown in FIG. 6A.

In the second shape and position describing means 25, pieces of figure data are formed with the initial coordinate data designating an external shape of the second body (or the commodity model 33) originally placed at reference position and orientation and the configuration data stored in the configuration and function setting means 26 to virtually display the evaluated commodity with the operating parts attached to the operating side. Thereafter, the figure data are changed by performing the translation movement and rotation of the second body according to the second measured data denoting the position and orientation of the second body. Thereafter, pieces of processed figure data designating an external shape of the second body placed at the three dimensional position and orientation of the second body detected in the second position and orientation inputting means 24 are produced. In this case, the processed figure data are formed at a state that any of shapes of the operating parts attached to the evaluated commodity is not changed by the virtual manipulation of the operating parts. Thereafter, the processed figure data of the second body are transferred to the virtual image displaying means 29. Therefore, as shown in FIG. 6B, the fingertip of the operator and the evaluated commodity Ce with the operating parts are virtually displayed in an image plane of the virtual image displaying means 29. When the operator moves his finger, the operator's fingertip displayed is also virtually moved in the same manner. When the commodity model 33 is moved, the evaluated commodity Ce displayed is also virtually moved in the same manner.

In the first embodiment, a remote control unit in a video system is used as the the commodity model 33. Therefore, as shown in FIG. 6B, many buttons pushed to perform various functions of the remote control unit are attached to the evaluated commodity Ce. The buttons are virtually pushed by the operator's fingertip.

Figure 7A:
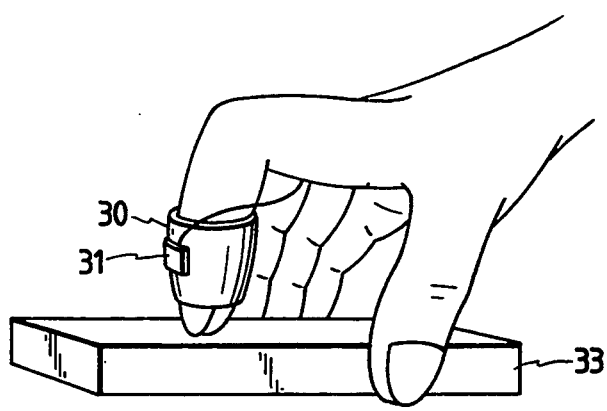
FIG. 7A explanatorily shows an operation in which a planned area of a commodity model grasped by an operator's hand is pushed by an operator's finger on which an attaching element with a first magnetic sensor is put.

In detail, as shown in FIG. 7A, when the operator pushes a planned area of an upper surface of the commodity model 33 with his finger having the attaching element 30, the first body put on one of the operating parts is virtually displayed in the virtual image displaying means 29 because the processed coordinate data formed in the first shape and position describing means 23 and the processed figure data formed in the second shape and position describing means 25 are transferred to the virtual image displaying means 29. Also, the processed coordinate data and the processed figure data are transferred to the contact state detecting means 27. In the contact state detecting means 27, a contact distance between a side of the first body and a side of the second body is calculated according to the processed coordinate data and the processed figure data to examine whether or not the first body is in contact with the second body at an interfering point.

Figure 8:
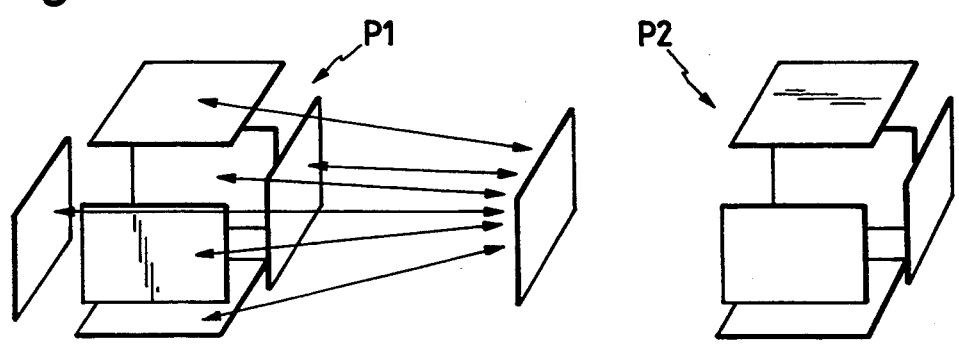
FIG. 8 generally shows a method for detecting an interfering point between a side of a first body and a side of a second body.

FIG. 8 shows a method for detecting the interfering point in the contact state detecting means 27.

As shown in FIG. 8, it is judged whether one of six sides of the first body modeled after a rectangular prism P1 interferes with one of six sides of the second body modeled after another rectangular prism P2. In detail, it is judged whether or not a first side of the second body overlaps with one of the sides of the first body. In cases where the contact distance is equal to zero, the first side of the second body overlaps with one of the sides of the first body. Therefore, it is judged that the first body interferes with the second body, and the interfering point equivalent to a position of the first side of the second body is detected. In contrast, in cases where the contact distance is not equal to zero, the first side of the second body does not overlap with any side of the first body. Therefore, it is judged that the first body does not interfere with the second body, and the interference at other sides of the second body is judged one after another in the same manner. In cases where any side of the second body does not overlap with one of the sides of the first body, it is judged that the first body does not interfere with the second body.

Figure 7B:
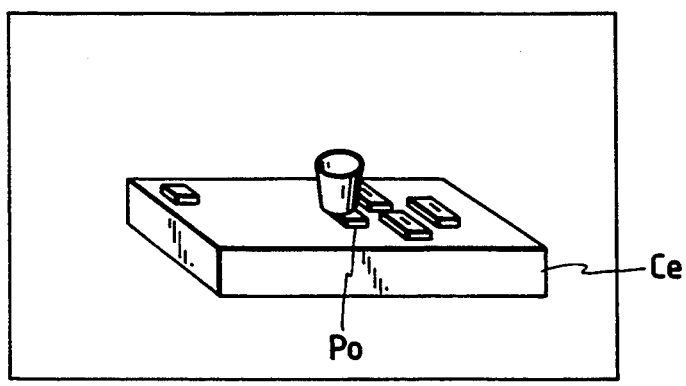
FIG. 7B shows a commodity model with a plurality of operating parts and an operator's fingertip representing a first body which are displayed in an image plane according to the operation shown in FIG. 7A, one of the operating parts being pushed down by the operator's fingertip.

In cases where one of the sides of the first body is in contact with one of the sides of the second body at the interfering point, a contact state between the first body and the second body is detected, and an operating part Po of the evaluated commodity Ce placed at the interfering point is detected in the contact state detecting means 27. Thereafter, a piece of part data denoting the operating part Po detected is transferred to the movement editing means 28. In the movement editing means 28, the function data pertaining to the operating part Po designated by the part data are read from the configuration and function setting means 26, and an expected movement of the operating part Po is edited according to the function data. Thereafter, a piece of movement data denoting the expected movement of the operating part Po is transferred to the second shape and position describing means 25. In the second shape and position describing means 25, a changed shape of the operating part Po in an operating period when the operating part Po functions is formed according to the movement data, and pieces of picture data denoting a changed external shape of the commodity model 33 in which a button corresponding to the operating part Po is pushed down are transferred to the virtual image displaying means 29. As a result, as shown in FIG. 7B, the fingertip of the operator pushing down the button corresponding to the operating part Po and the button pushed down by the fingertip are virtually displayed in the virtual image displaying means 29.

Accordingly, when the operator pushes down a planned area of the operating side of the commodity model 33 imitating the evaluated commodity Ce, the first body pushing down the operating part Po planned to be arranged at the planned area of the evaluated commodity Ce and the evaluated commodity Ce of which the operating part Po is pushed down by the first body can be virtually displayed as if the operating part Po of the evaluated commodity Ce is actually operated by the operator.

Also, because the changed shape of the operating part Po pushed down by the first body is visually displayed, the operator can reliably ascertain which of the operating parts is virtually pushed down.

Also, because the changed shape of the operating part Po pushed down by the first body is virtually displayed, an manipulation performance of the evaluated commodity Ce having the same external shape as that of the second body can be evaluated without making the evaluated commodity Ce on an experimental basis.

Also, because the changed shape of the operating part Po pushed down by the first body is visually displayed, the operator can actually feel a state that the external shape of the evaluated commodity Ce is virtually changed when the first body (or the operator's fingertip) is in contact with the second body (or the commodity model 33), without making the evaluated commodity Ce on an experimental basis.

In cases where it is judged by the operator that the position or shape of the operating part Po is improper because the manipulation performance of the evaluated commodity Ce is inferior, the configuration data and/or the function data set in the configuration and function setting means 26 are changed to enhance the manipulation performance of the evaluated commodity Ce. Therefore, the enhancement of the manipulation performance of the evaluated commodity Ce can be achieved without making the evaluated commodity Ce on an experimental basis. Also, because the configuration data and/or the function data set in the configuration and function setting means 26 can be changed many times, the manipulation performance of the evaluated commodity Ce can be gradually enhanced without making the evaluated commodity Ce on an experimental basis, and the change of the configuration data and/or the function data can be continued without making the evaluated commodity Ce on an experimental basis until a favorable impression in the manipulation performance is made on the operator.

In the first embodiment, the button pushed down is displayed as the changed shape of the operating part Po. However, it is preferred that the operating part Po manipulated by the first body be highlighted. Also, it is preferred that an explanatory sentence be superimposed on the display of the evaluated commodity Ce virtually manipulated by the first body to describe the expected movement of the operating part Po.

Also, the first body is not limited to the operator's fingertip. That is, any element which interferes with the second body at an interfering point to virtually change the external shape of the evaluated commodity Ce according to the movements of the operating parts is applicable as the first body.

(Second Embodiment)

Next, a second embodiment is described with reference to FIG. 9.

Figure 9:
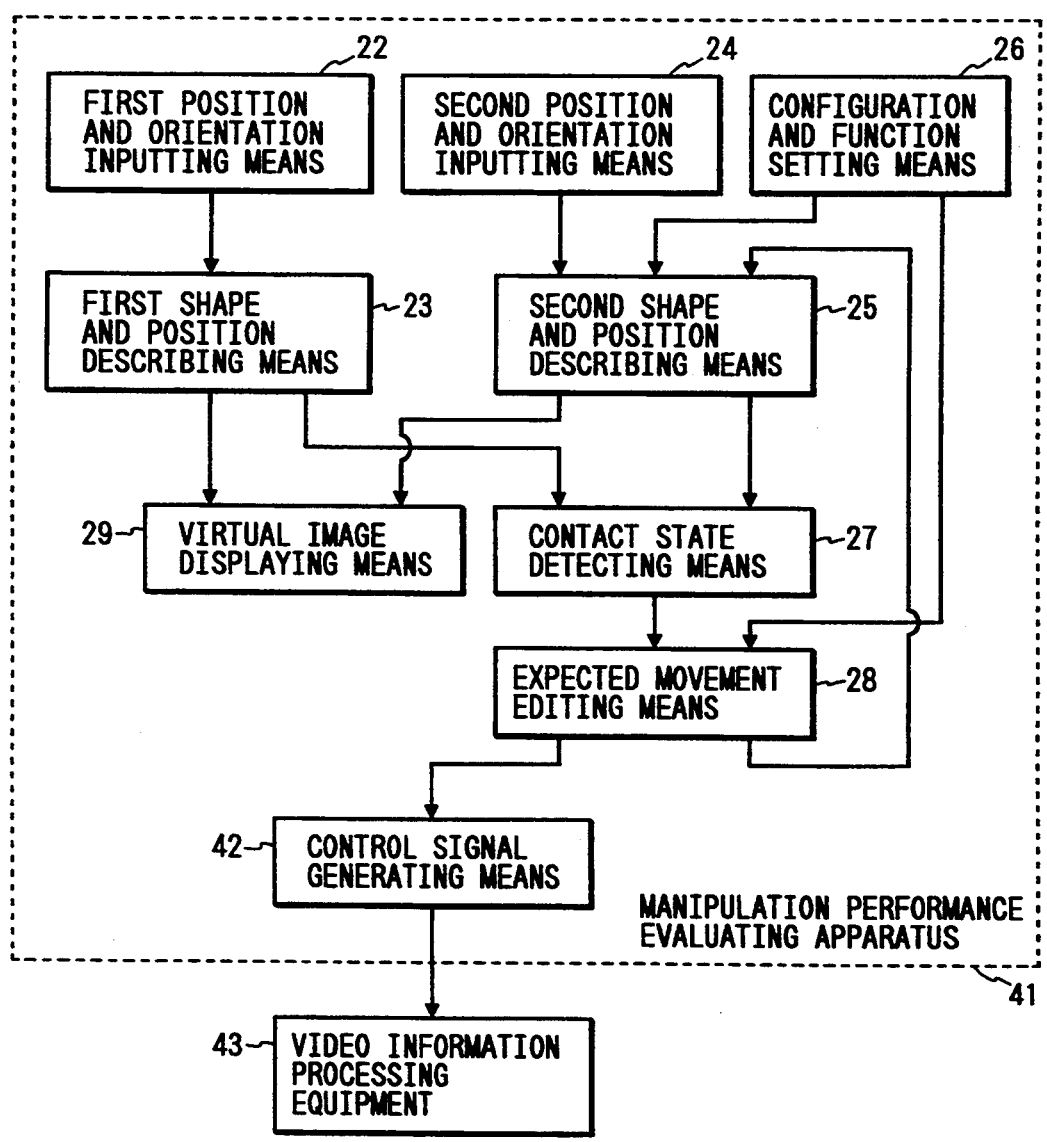
FIG. 9 is a block diagram of a manipulation performance evaluating apparatus according to a second embodiment of the present invention.

FIG. 9 is a block diagram of a manipulation performance evaluating apparatus according to a second embodiment of the present invention.

In the second embodiment, when the operating part Po of an evaluated commodity Ce having the same external shape as that of the second body is virtually manipulated, not only the changed shape of the operating part Po is virtually displayed in an image plane of the virtual image displaying means 29, but also an associated equipment is actually moved or operated according to the function of the operating part Po.

As shown in FIG. 9, a manipulation performance evaluating apparatus 41 comprises the first position and orientation inputting means 22, the first shape and position describing means 23, the second position and orientation inputting means 24, the second shape and position describing means 25, the configuration and function setting means 26, the contact state detecting means 27, the expected movement editing means 28, the virtual image displaying means 29, a control signal generating means 42 for generating a control signal corresponding to the operating part Po detected in the contact state detecting means 27 to control the operation of a video information processing equipment 43.

In the above configuration, an operator puts the attaching element 30 of the first position and orientation inputting means 22 on his finger, and the operator pushes down a planned area of the upper side of the commodity model 33 with his finger having the attaching element 30. Thereafter, the operating part Po planned to be arranged at the planned area is detected in the contact state detecting means 27, and the part data denoting the operating part Po is transferred to the expected movement editing means 28. Also, a piece of function data designating a function of the operating part Po is transferred to the expected movement editing means 28 to move or operate an associated equipment like the video information processing equipment 43. In the expected movement editing means 28, the movement data denoting the expected movement of the operating part Po is generated and transferred to the second shape and position describing means 25 to virtually display the first body pushing down the operating part Po arranged at the interfering point and the evaluated commodity Ce of which the operating part Po is pushed down by the first body. Also, a piece of instructing information for moving or operating the associated equipment is edited according to the function data, and the instructing information is transferred to the control signal generating means 42. In the control signal generating means 42, a control signal is generated to control the movement or the operation of the associated equipment according to the instructing information. Therefore, the operation of the video information processing equipment 43 is actually performed under control of the control signal.

In cases where the operating part Po is, for example, a play button of a remote control unit, the control signal instructing to start the operation of the video information processing equipment 43 is output from the control signal generating means 42. Therefore, the video information processing equipment 43 starts to play its operation.

Accordingly, when the operator virtually manipulates the operating part Po of the evaluated commodity Ce, not only the changed shape of the operating part Po pushed down by the first body is virtually displayed, but also an associated equipment like the video information processing equipment 43 can be actually operated according to the function of the operating part Po. Therefore, the operator can actually feels the movement or operation of the associated equipment which is caused by the interference of the second body with the first body, without making the evaluated commodity Ce on an experimental basis, so that a manipulation performance of the evaluated commodity Ce having the same external shape as that of the second body can be evaluated according to an actual state in which the associated equipment is operated or moved according to the function of the operating part Po.

Figure 10:
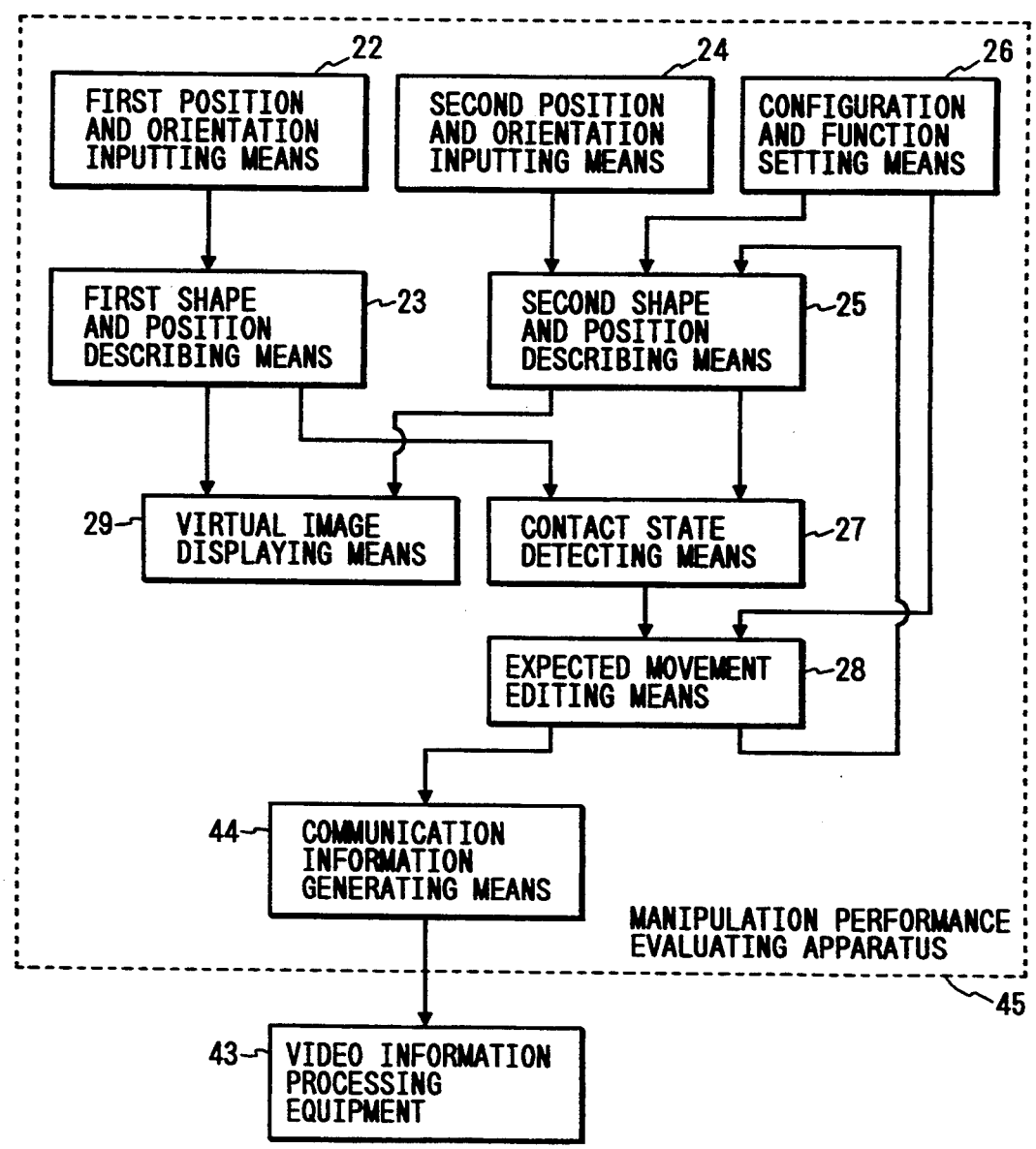
FIG. 10 is a block diagram of a manipulation performance evaluating apparatus according to a modification of the second embodiment of the present invention.

In the second embodiment, the control signal generating means 42 is additionally provided for the manipulation performance evaluating apparatus 21 to obtain the manipulation performance evaluating apparatus 41. However, the second embodiment is not limited to the means 42. That is, as shown in FIG. 10, it is applicable that a communication information generating means 44 be utilized in place of the means 42 to constitute an manipulation performance evaluating apparatus 45.

In the evaluating apparatus 45, the communication information generating means 44 has a telecommunication facility. Therefore, a control signal is generated corresponding to the operating part Po and the expected movement of the operating part Po, and the control signal is transferred to the video information processing equipment 43 through a telecommunication network.

Accordingly, the operator can actually feel the movement or operation of an associated equipment like the video information processing equipment 43 without making the evaluated commodity Ce on an experimental basis.

(Third Embodiment)

Next, a third embodiment is described with reference to FIGS. 11 to 13.

Figure 11:
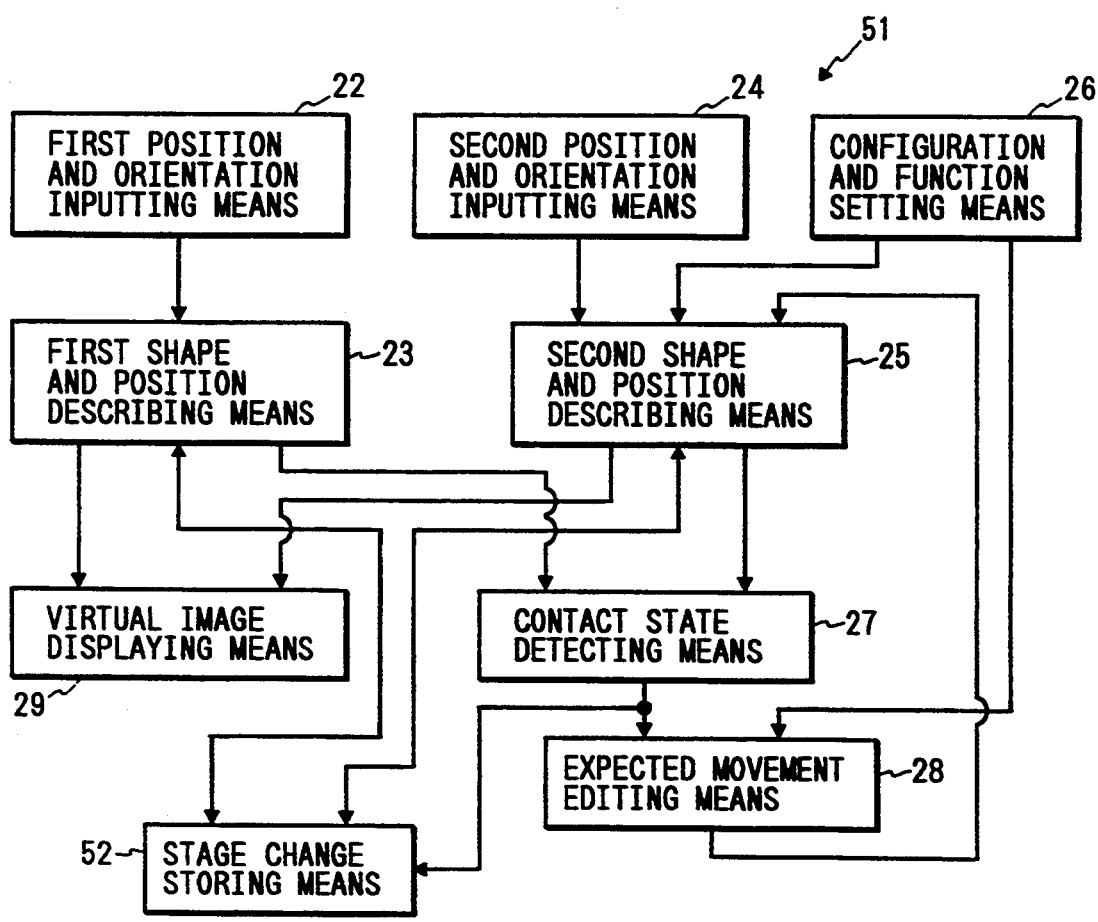
FIG. 11 is a block diagram of a manipulation performance evaluating apparatus according to a third embodiment of the present invention.

FIG. 11 is a block diagram of a manipulation performance evaluating apparatus according to a third embodiment of the present invention.

In the third embodiment, in cases where the operating part Po of an evaluated commodity Ce having the same external shape as that of the second body is virtually manipulated according to a first manipulation, it is possible to repeatedly evaluate a manipulation performance of the evaluated commodity Ce while observing the changed shape of the operating part Po virtually displayed in an image plane of the virtual image displaying means 29 even though another operating part of the evaluated commodity Ce is virtually manipulated according to a second manipulation following the first manipulation.

As shown in FIG. 11, a manipulation performance evaluating apparatus 51 comprises the first position and orientation inputting means 22, the first shape and position describing means 23, the second position and orientation inputting means 24, the second shape and position describing means 25, the configuration and function setting means 26, the contact state detecting means 27, the expected movement editing means 28, the virtual image displaying means 29, and a state change storing means 52 for storing the external shape of the first body produced in the first shape and position describing means 23 and the external shape of the second body produced in the second shape and position describing means 25.

In the above configuration, each time an operating part Po of the evaluated commodity Ce placed at an interfering point at which the first body interferes with the second body is detected in the contact state detecting means 27, the processed coordinate data produced in the first shape and position describing means 23 are stored in the state change storing means 52 as the external shape of the first body placed at the three dimensional position and orientation of the first body detected in the first position and orientation inputting means 22, and the processed figure data produced in the second shape and position describing means 25 are stored in the state change storing means 52 as the external shape of the second body placed at the three dimensional position and orientation of the second body detected in the second position and orientation inputting means 24. Therefore, state changes of the first and second bodies are substantially stored in the state change storing means 52.

Also, the processed coordinate data stored in the first body describing means 23 and the processed figure data stored in the second body describing means 25 are stored in the state change storing means 52 each time a prescribed period elapses. FIG. 12A shows a positional vector designating three dimensional position and orientation of a body. FIG. 12B shows a positional vector defined to designate the three dimensional position and orientation of the first body. FIG. 13 shows the processed coordinate data denoting the three dimensional position and orientation of the first body and the processed figure data denoting the three dimensional position and orientation of the second body in tabular form.

As shown in FIG. 12A, three dimensional position and orientation of a body are generally designated by a starting point Ps of a positional vector Vp and an orientation of the positional vector Vp. The starting point Ps of the positional vector Vp is placed at coordinates (x, y, z), and the orientation of the positional vector Vp is designated by three directional angles ($\alpha$, $\beta$, $\gamma$). In this case, the three dimensional position and orientation of a body are generally designated by a piece of coordinate and directional angle data (x, y, z, $\alpha$, $\beta$, $\gamma$).

As shown in FIG. 12B, a positional vector V1 of the first body is defined. The positional relationship between the positional vector V1 and the first body is fixed. In this case, the three dimensional position and orientation of the first body are designated by a starting point of the positional vector V1 and an orientation of the positional vector V1. For example, the starting point of the positional vector V1 oriented in a direction ($\alpha_1$, $\beta_1$, $\gamma_1$) is placed at a three dimensional position ($x_1$, $y_1$, $z_1$) in a first manipulation, and the starting point of the positional vector V1 oriented in a direction ($\alpha_2$, $\beta_2$, $\gamma_2$) is placed at a three dimensional position ($x_2$, $y_2$, $z_2$) in a second manipulation. Also, the three dimensional position and orientation of the second body are designated in the same manner.

In the state change storing means 52, as shown in FIG. 13, pieces of coordinate and directional angle data $(x_1, y_1, z_1, \alpha_1, \beta_1, \gamma_1)$ and $(x_{11}, y_{11}, z_{11}, \alpha_{11}, \beta_{11}, \gamma_{11})$, $(x_2, y_2, z_2, \alpha_2, \beta_2, \gamma_2)$ and $(x_{12}, y_{12}, z_{12}, \alpha_{12}, \beta_{12}, \gamma_{12})$, —of the first and second bodies are stored. Therefore, a state change of the first or second body is indicated as a difference between two pieces of coordinate and directional angle data. In other words, degrees of movement of the first and second bodies are stored in the state change storing means 52.

After many operating parts of the evaluated commodity Ce are virtually manipulated according to a series of manipulations, many pieces of coordinate and directional angle data are stored in the state change storing means 52. Thereafter, a pair of pieces of coordinate and directional angle data of the first and second bodies relating to a first manipulation selected from among the manipulations are read out from the state change storing means 52 to the virtual image displaying means 29 through the describing means 23, 25 to virtually display again the evaluated commodity Ce manipulated by the first body in the first manipulation. Therefore, even though a second manipulation following the first manipulation is performed, the virtual display of the evaluated commodity Ce manipulated by the first body in the first manipulation can be repeatedly reproduced in the virtual image displaying means 29 without repeatedly inputting the three dimensional position and orientation of the first and second bodies in the first manipulation to the first and second position and orientation inputting means 22, 24.

Accordingly, a manipulation performance of the evaluated commodity Ce having the same external shape as that of the second body can be repeatedly evaluated without repeatedly inputting the three dimensional position and orientation of the first and second bodies.

(Fourth Embodiment)

Next, a fourth embodiment is described with reference to FIGS. 14, 15.

Figure 14:
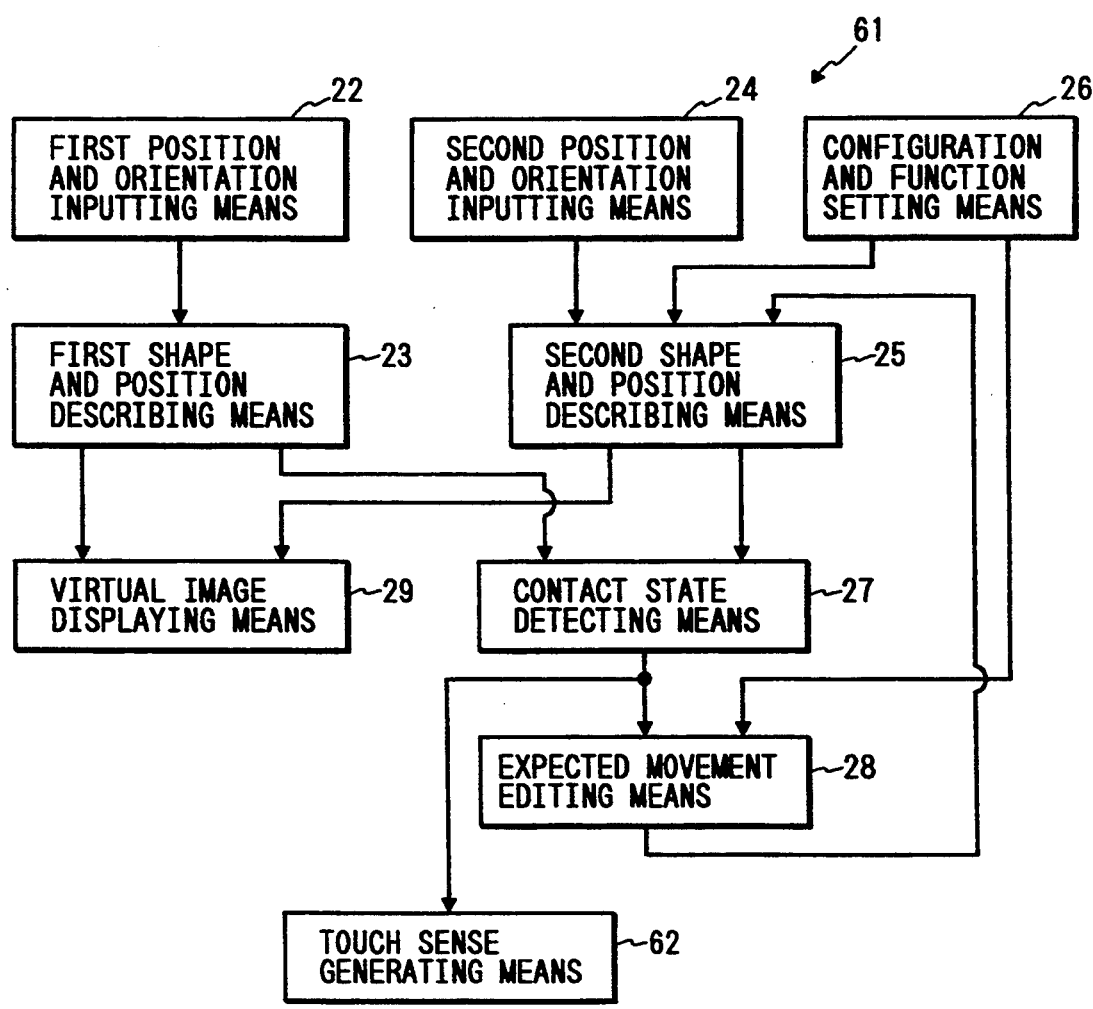
FIG. 14 is a block diagram of a manipulation performance evaluating apparatus according to a fourth embodiment of the present invention.
Figure 15A:
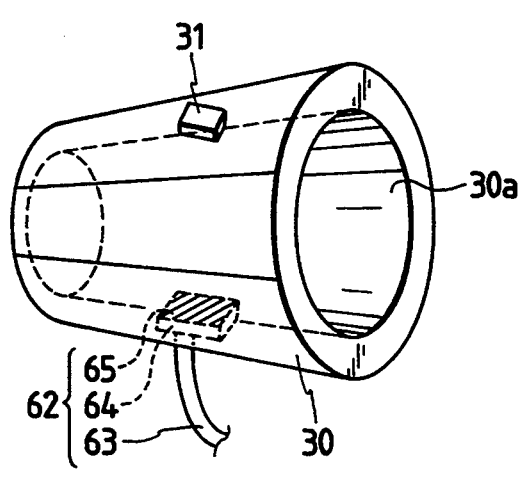
FIG. 15A is a diagonal perspective view of an attaching element with a touch sense generating mean.
Figure 15B:
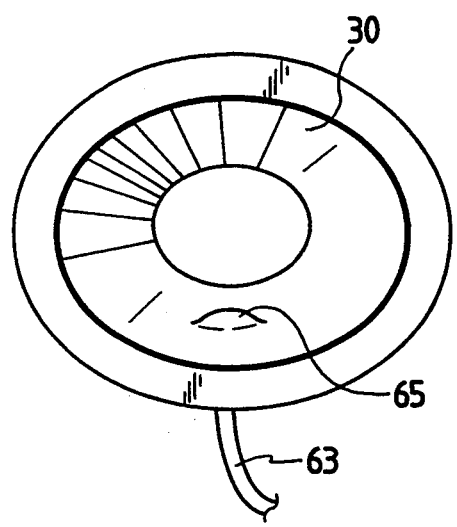
FIG. 15B is a front view of the attaching element shown in FIG. 15A to show an expanded elastic film projected in a hollow portion of the attaching element.
Figure 15C:
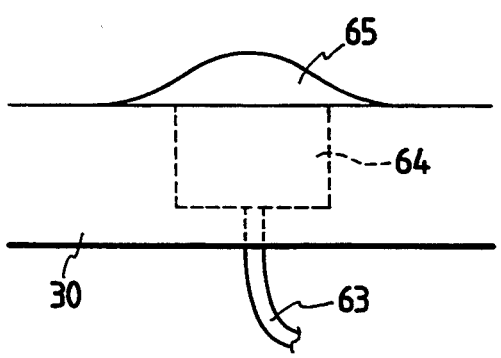
FIG. 15C is an enlarged cross sectional view of a touch sense generating means provided in the attaching element shown in FIG. 15A.

FIG. 14 is a block diagram of a manipulation performance evaluating apparatus according to a fourth embodiment of the present invention. FIG. 15A is a diagonal perspective view of the attaching element 30 with a touch sense generating means. FIG. 15B is a front view of the attaching element 30 to show an expanded elastic film projected in a hollow portion of the attaching element 30. FIG. 15C is an enlarged cross sectional view of a touch sense generating means provided in the attaching element 30.

In the fourth embodiment, when the operating part Po of an evaluated commodity Ce having the same external shape as that of the second body is virtually manipulated, the operator imitatively feels a sense of touch with the operating part Po.

As shown in FIG. 14, a manipulation performance evaluating apparatus 61 comprises the first position and orientation inputting means 22, the first shape and position describing means 23, the second position and orientation inputting means 24, the second shape and position describing means 25, the configuration and function setting means 26, the contact state detecting means 27, the expected movement editing means 28, the virtual image displaying means 29, and a touch sense generating means 62 for generating a sense of touch with the operating part Po according to the judgement that a side of the first body interferes with a side of the second body.

As shown in FIG. 15A, the touch sense generating means 62 comprises an air tube 63 connected to a side of the attaching element 30 for flowing air, an air chamber 64 for holding the air flowing through the air tube 63, and an elastic film 65 for expanding and contracting according to an air pressure held in the air chamber 64.

In the above configuration, when it is judged in the contact state detecting means 27 that a side of the first body interferes with a side of the second body, a judging signal is transferred to the touch sense generating means 62. In the touch sense generating means 62, air is sent to the air chamber 64 through the air tube 63 to increase an air pressure of the air chamber 64 in synchronization with the judging signal. Thereafter, as shown in FIGS. 15B, 15C, the elastic film 65 is expanded and projected into a hollow portion 30a of the attaching element 30, and the operator's finger put in the hollow portion 30a of the attaching element 30 is pressed. Therefore, the operator imitatively feels a sense of touch with the operating part Po.

Accordingly, a manipulation performance of the evaluated commodity Ce having the same external shape as that of the second body can be evaluated without making the evaluated commodity Ce on an experimental basis while the operator imitatively feels a sense of touch with the operating part Po.

(Fifth Embodiment)

Next, a fifth embodiment is described with reference to FIGS. 16, 17.

Figure 16:
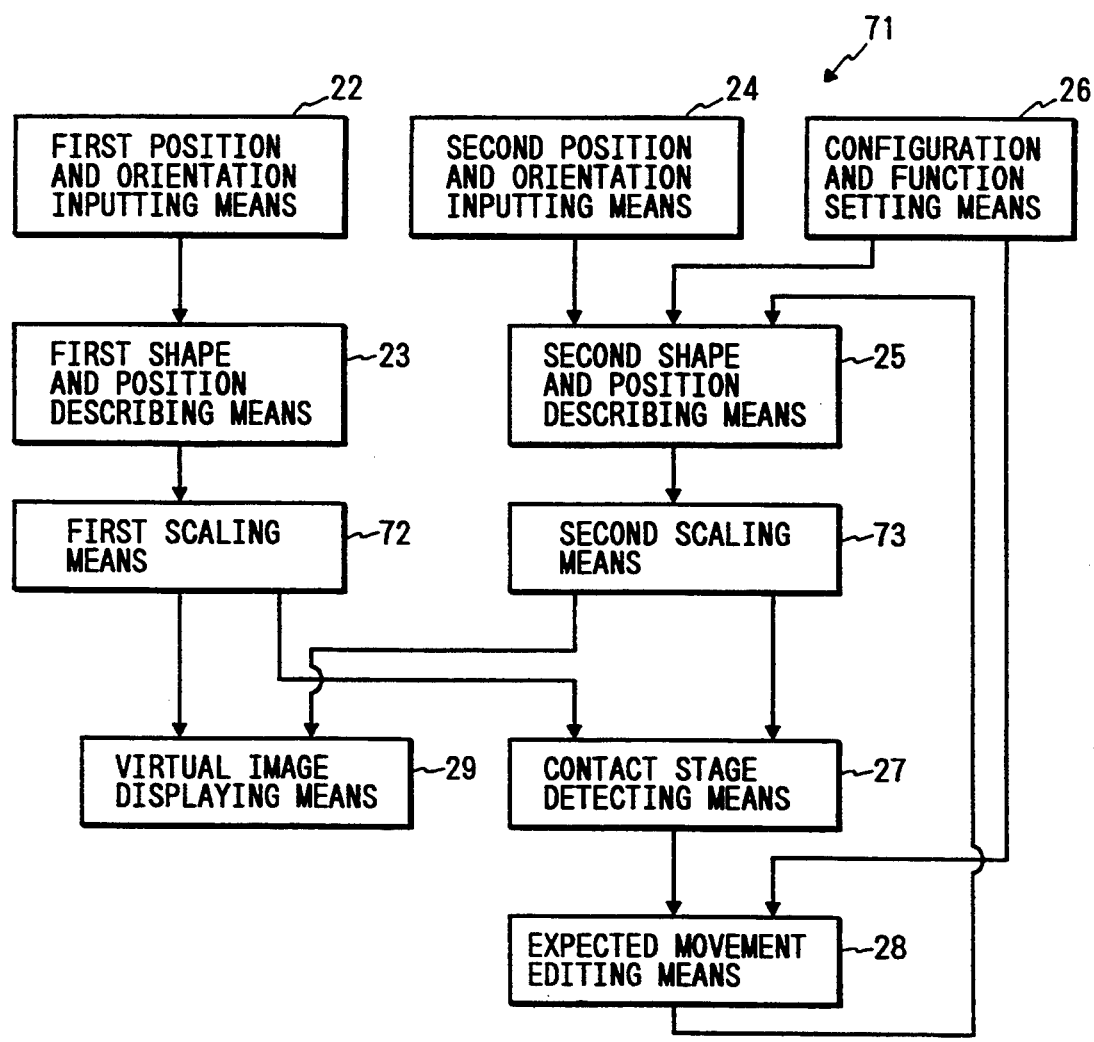
FIG. 16 is a block diagram of a manipulation performance evaluating apparatus according to a fifth embodiment of the present invention.
Figure 17A:
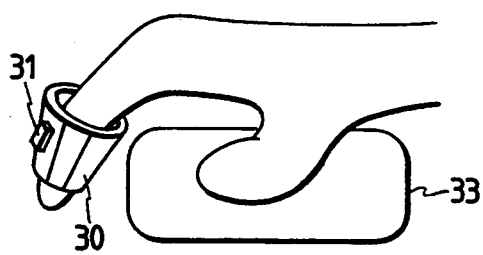
FIG. 17A shows an operation in which an operator grasps a commodity model with his hand to push down a switch.
Figure 17B:
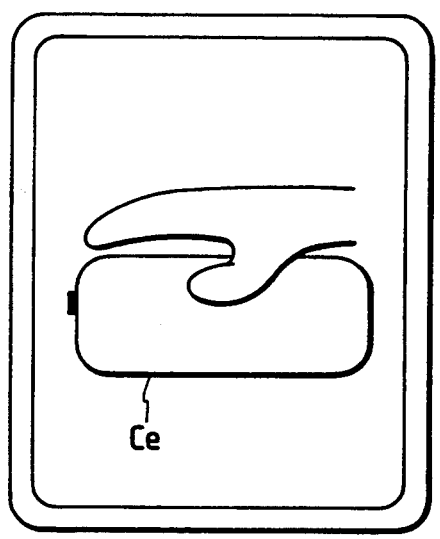
FIG. 17B shows an operator's hand and a commodity model displayed in an image plane according to the operation shown in FIG. 17A on condition that a first scaling means or a second scaling means shown in FIG. 16 does not function.
Figure 17C:
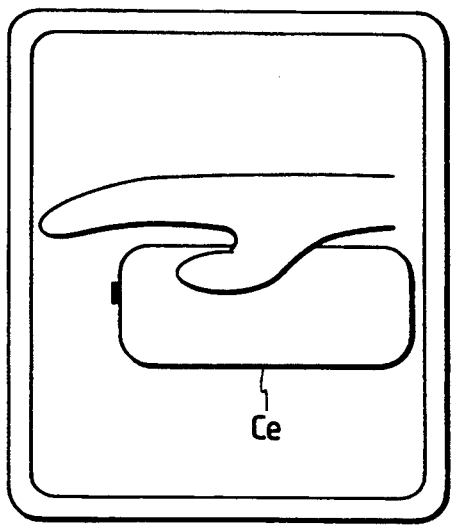
FIG. 17C shows an operator's hand scaled up and a commodity model displayed in an image plane according to the operation shown in FIG. 17A on condition that a first scaling means shown in FIG. 16 functions.
Figure 17D:
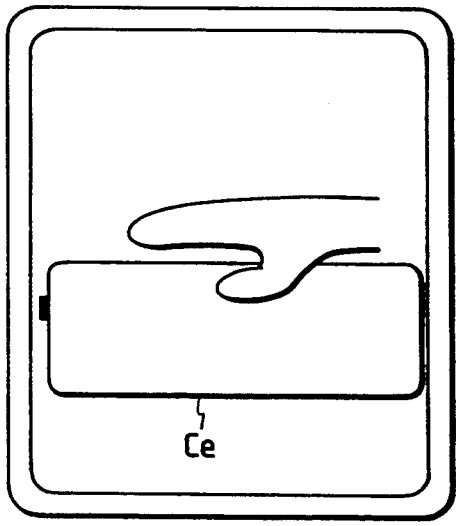
FIG. 17D shows an operator's hand and a commodity model scaled up which are displayed in an image plane according to the operation shown in FIG. 17A on condition that a second scaling means shown in FIG. 16 functions.

FIG. 16 is a block diagram of a manipulation performance evaluating apparatus according to a fifth embodiment of the present invention. FIG. 17A shows an operation in which an operator grasps the commodity model 33 with his hand to push down a switch. FIG. 17B shows an operator's hand and the commodity model 33 displayed in the virtual image displaying means 29 according to the operation shown in FIG. 17A on condition that a first scaling means or a second scaling means shown in FIG. 16 does not function. FIG. 17C shows an operator's hand simulatively scaled up and the commodity model 33 displayed in the virtual image displaying means 29 according to the operation shown in FIG. 17A on condition that a first scaling means shown in FIG. 16 functions. FIG. 17D shows an operator's hand and the commodity model 33 simulatively scaled up which are displayed in the virtual image displaying means 29 according to the operation shown in FIG. 17A on condition that a first scaling means shown in FIG. 16 functions.

In the fifth embodiment, an external shape of the second body is simulatively scaled up or down to evaluate a manipulation performance of an evaluated commodity Ce having an external shape larger or smaller than that of the second body without changing the initial coordinate data corresponding to the external shape of the second body stored in the describing means 25. Also, an external shape of the first body is simulatively scaled up or down to evaluate a manipulation performance of an evaluated commodity Ce having a similar external shape to that of the second body without changing the initial coordinate data corresponding to the external shape of the first body stored in the describing means 23.

As shown in FIG. 16, a manipulation performance evaluating apparatus 71 comprises the first position and orientation inputting means 22, the first shape and position describing means 23, the second position and orientation inputting means 24, the second shape and position describing means 25, the configuration and function setting means 26, the contact state detecting means 27, the expected movement editing means 28, the virtual image displaying means 29, a first scaling means 72 for simulatively scaling up or down an external shape of the first body produced in the first shape and position describing means 23, and a second scaling means 73 for simulatively scaling up or down an external shape of the second body produced in the second shape and position describing means 25.

In the fifth embodiment, the first body denotes an operator's hand. Therefore, the initial coordinate data stored in the first shape and position describing means 23 correspond to an operator's hand.

In the above configuration, as shown in FIG. 17A, when an operator grasps the commodity model 33 to virtually push down a switch of an evaluated commodity Ce having the same external shape as that of the second body with his finger having the attaching element 30, the evaluated commodity Ce and the first body (or an operator's hand) grasping the evaluated commodity Ce are virtually displayed in an image plane of the virtual image displaying means 29, as shown in FIG. 17B. In this case, the first body displayed in the virtual image displaying means 29 is not simulatively scaled up or down because the first scaling means 72 does not function. Also, the second body displayed in the virtual image displaying means 29 is not simulatively scaled up or down because the second scaling means 73 does not function. Therefore, a manipulation performance of the evaluated commodity Ce can be evaluated on condition that a user having the same hand size as that of the operator operates the evaluated commodity Ce.

Also, in cases where the operator intends to evaluate a manipulation performance of an evaluated commodity Ce having the same external shape as that of the commodity model 33 on condition that a user having a larger hand than that of the operator operates the commodity, an external shape of the first body produced in the first shape and position describing means 23 is simulatively scaled up in the first scaling means 72. Thereafter, pieces of processed coordinate data corresponding to the external shape of the first body simulatively scaled up are transferred to the virtual image displaying means 29 and the contact state detecting means 27. Thereafter, an operating part Po of the evaluated commodity Ce placed at an interfering point between the attaching element 30 put on an operator's finger simulatively scaled up and the commodity model 33 is detected in the contact state detecting means 27. Thereafter, as shown in FIG. 17C, an operator's hand simulatively scaled up and the evaluated commodity Ce are virtually displayed in an image plane of the virtual image displaying means 29.

Accordingly, even though a user's hand is larger than the operator's hand, the operator can evaluate a manipulation performance of the evaluated commodity Ce having the same external shape as that of the second body without making the evaluated commodity Ce on an experimental basis on condition that the user operates the evaluated commodity Ce.

In cases where the operator intends to evaluate an manipulation performance of an evaluated commodity Ce having an external shape larger than that of the commodity model 33, an external shape of the second body produced in the second shape describing means 25 is simulatively scaled up in the second scaling means 73. Thereafter, pieces of processed figure data corresponding to the external shape of the second body simulatively scaled up are transferred to the virtual image displaying means 29 and the contact state detecting means 27. Thereafter, an operating part Po of the evaluated commodity Ce placed at an interfering point between the attaching element 30 put on an operator's finger and the commodity model 33 simulatively scaled up is detected in the contact state detecting means 27. Thereafter, as shown in FIG. 17D, the evaluated commodity Ce having the same external shape as that of the commodity model 33 simulatively scaled up and an operator's hand are virtually displayed in an image plane of the virtual image displaying means 29.

Accordingly, even though an external shape of the evaluated commodity Ce is larger than that of the commodity model 33, the operator can evaluate a manipulation performance of the evaluated commodity Ce without making the evaluated commodity Ce on an experimental basis.

Also, assuming that the first scaling means 72 is not provided for the manipulation performance evaluating apparatus 71, even though an external shape of the second body produced in the second shape and position describing means 25 is simulatively scaled up or down in the second scaling means 73, an elevation of an interfering point between the attaching element 30 put on an operator's finger and the commodity model 33 simulatively scaled up or down cannot be set to a height lower than a lowest limit which depends on a real size of the commodity model 33. However, because the first scaling means 72 is provided for the manipulation performance evaluating apparatus 71, the elevation of the interfering point can be arbitrarily set in cases where an external shape of the first body produced in the first shape and position describing means 23 is simulatively scaled up or down in the first scaling means 72. In other words, because the first scaling means 72 and the second scaling means 73 are additionally provided, the operator can arbitrarily evaluate a manipulation performance of the evaluated commodity Ce without being limited by a real size of the commodity model 33. That is, a manipulation performance of the evaluated commodity Ce can be evaluated by arbitrarily setting a position of the interfering point while simulatively and separately changing the size of the operator's hand and the commodity model 33.

In the fifth embodiment, the first body denotes an operator's hand. However, the first body is not limited to an operator's hand, and it is applicable that the first body denote an operator's fingertip or an operator's finger.

Having illustrated and described the principles of our invention in a preferred embodiment thereof, it should be readily apparent to those skilled in the art that the invention can be modified in arrangement and detail without departing from such principles. We claim all modifications coming within the spirit and scope of the accompanying claims.

What is claimed is:

1. A manipulation performance evaluating apparatus for evaluating a manipulation performance of an evaluated commodity with an operating part by interfering a first body with a second body imitating the evaluated commodity to virtually manipulate the operating part with the first body, comprising:

first position and orientation inputting means for inputting three dimensional position and orientation of a first body;

second position and orientation inputting means for inputting three dimensional position and orientation of a second body, an external shape of the second body being similar to that of an evaluated commodity;

function setting means for setting a particular position of an operating part attached to the evaluated commodity and a movement of the operating part virtually manipulated by the first body;

interference detecting means for detecting an interference of the second body placed at the three dimensional position and orientation input to the second position and orientation inputting means with the first body placed at the three dimensional position and orientation input to the first position and orientation inputting means and detecting the operating part virtually placed at the particular position of the evaluated commodity set in the function setting means, the particular position corresponding to an interfering point at which the second body interferes with the first body;

expected movement editing means for editing an expected movement of the operating part of the evaluated commodity detected in the interference detecting means according to the movement of the operating part set in the function setting means, an external shape of the operating part being virtually changed by the manipulation of the first body;

first position and shape describing means for producing an external shape of the first body placed at the three dimensional position and orientation input to the first position and orientation inputting means to describe the first body with which the operating part attached to the evaluated commodity is virtually manipulated;

second position and shape describing means for producing an external shape of the second body placed at the three dimensional position and orientation input to the second position and orientation inputting means to describe an external shape of the evaluated commodity placed at the three dimensional position and orientation input to the second position and orientation inputting means and an external shape of the operating part virtually changed according to the expected movement edited in the expected movement editing means; and virtual image displaying means for virtually displaying the external shape of the evaluated commodity with the operating part described in the second position and shape describing means and the first body described in the first position and shape describing means to evaluate a manipulation performance of the evaluated commodity with the operating part.

2. A manipulation performance evaluating apparatus according to claim 1, additionally including:

control signal generating means for generating a control signal according to a function of the operating part caused by the expected movement of the operating part of the evaluated commodity edited in the expected movement editing means, an associated equipment being moved or operated according to the control signal transferred from the control signal generating means.

3. A manipulation performance evaluating apparatus according to claim 1, additionally including:

communication information generating means having a telecommunication facility for generating a control signal according to a function of the operating part caused by the expected movement of the operating part of the evaluated commodity edited in the expected movement editing means to telecommunicate the control signal to an associated equipment with the telecommunication facility, the associated equipment being moved or operated according to the control signal telecommunicated.

4. A manipulation performance evaluating apparatus according to claim 1, additionally including:

state change storing means for storing the position of the first body produced in the first position and shape describing means and the position and external shape of the second body produced in the second position and shape describing means each time an interference of the second body with the first body is detected in the interference detecting means, the position of the first body and the position and external shape of the second body pertaining to a manipulation being read out from the state change storing means to the first position and shape describing means and the second position and shape describing means to virtually display the first body and the evaluated commodity with the operating part after the manipulation is finished.

5. A manipulation performance evaluating apparatus according to claim 1, additionally including:

state change storing means for storing the position of the first body produced in the first position and shape describing means and the position and external shape of the second body produced in the second position and shape describing means at regular intervals, the position of the first body and the position and external shape of the second body being read out from the state change storing means to the first position and shape describing means and the second position and shape describing means at the regular intervals to virtually display the first body and the evaluated commodity with the operating part.

6. A manipulation performance evaluating apparatus according to claim 1, additionally including:

touch sense generating means for generating a sense of touch with the operating part according to the detection of the interference of the second body with the first body detected in the interference detecting means, an operator actually feeling the sense of touch.

7. A manipulation performance evaluating apparatus according to claim 6 in which the touch sense generating means comprises an air chamber put on an operator's finger for holding air, the air chamber being expanded to give the sense of touch to the operator.

8. A manipulation performance evaluating apparatus according to claim 1, additionally including:

external shape scaling means for simulatively scaling up or down the external shape of the first or second body produced in the first position and shape describing means or the second position and shape describing means.

9. A manipulation performance evaluating apparatus according to claim 1, additionally including:

first external shape scaling means for simulatively scaling up or down the external shape of the first body produced in the first position and shape describing means; and second external shape scaling means for simulatively scaling up or down the external shape of the second body produced in the second position and shape describing means.

* * * * *